US008594672B2

(12) United States Patent
Agrawal et al.

(10) Patent No.: US 8,594,672 B2
(45) Date of Patent: Nov. 26, 2013

(54) METHODS AND APPARATUS FOR INTERFERENCE MANAGEMENT

(75) Inventors: Rajeev Agrawal, Glenview, IL (US); Rangsan Leelahakriengkrai, Overland Park, KS (US); Anand S. Bedekar, Arlington Heights, IL (US); Guang Han, Buffalo Grove, IL (US)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 13/332,538

(22) Filed: Dec. 21, 2011

(65) Prior Publication Data

US 2013/0084865 A1    Apr. 4, 2013

Related U.S. Application Data

(60) Provisional application No. 61/540,697, filed on Sep. 29, 2011, provisional application No. 61/540,752, filed on Sep. 29, 2011.

(51) Int. Cl.
*H04W 36/00* (2009.01)

(52) U.S. Cl.
USPC ........... 455/436; 455/437; 455/442; 455/439; 455/438; 455/450; 455/452.1; 455/453; 370/331

(58) Field of Classification Search
USPC ................. 455/436, 437, 442, 439, 438, 450, 455/452.1, 453; 370/331
See application file for complete search history.

(56) References Cited

U.S. PATENT DOCUMENTS

| 2010/0267408 | A1 | 10/2010 | Lee et al. ................ 455/509 |
| 2011/0164489 | A1* | 7/2011 | Papasakellariou et al. ... 370/203 |
| 2011/0249642 | A1* | 10/2011 | Song et al. ................ 370/329 |
| 2011/0310830 | A1* | 12/2011 | Wu et al. ................ 370/329 |
| 2012/0087298 | A1* | 4/2012 | Garavaglia et al. ........ 370/315 |
| 2012/0099505 | A1* | 4/2012 | Wang et al. ................ 370/312 |
| 2012/0157082 | A1* | 6/2012 | Pedersen et al. ......... 455/422.1 |
| 2012/0231790 | A1* | 9/2012 | Lindoff et al. ............ 455/434 |

FOREIGN PATENT DOCUMENTS

WO    WO-2010/116340 A1    10/2010

OTHER PUBLICATIONS

Damnjanovic, A., et al.; A Survey on 3GPP Heterogeneous Networks; IEEE Wireless Communications • Jun. 2011; vol. 18, Issue 3; abstract; pp. 17-18,20; figure 5; "Interference management for co-channel deployments", "Conclusions" (http://www.slideshare.net/zahidtg/a-survey-on3gpphetrogeneousnetworks).

(Continued)

*Primary Examiner* — Khalid Shaheed
(74) *Attorney, Agent, or Firm* — Harrington & Smith

(57) ABSTRACT

Systems and techniques for managing the use of almost blank subframes in wireless communication systems. Base stations in a wireless network monitor load information affecting network nodes. Load information may be in the form of load metric information. The load information may be exchanged between system elements, and an almost blank subframe proportioning may be updated by one or more of the base stations, and information relating to the updated proportioning. The updated almost blank subframe proportioning may be used in scheduling and load metric calculation, as well as almost blank subframe patterning. Updating of almost blank subframe information and load metric information may be performed iteratively.

19 Claims, 6 Drawing Sheets

(56) References Cited

OTHER PUBLICATIONS

Vajapeyam, M., et al.; "Downlink FTP Performance of Heterogeneous Networks for LTE-Advance" Vajapeyam, M., et al. Communications Workshop (ICC), 2011 IEEE International Conference of. Jun. 5-9, 2011; abstract; pp. 2-3; "LTE—A HETNET Techniques", "Conclusions".

3GPP TSG RAN WG1 Meeting #62; R1-104416; Madrid, Spain, Aug. 23-27, 2010; Further Considerations of Time Domain Approach; Alcatel-Lucent, Alcatel-Lucent Shanghai Bell.

"Range Expansion and Inter-Cell Interference Coordination (ICIC) for Picocell Networks" Guvenc, I., et al; Vehicular Technology Conference (VTC Fall) 2011 IEE, Sep. 5-8, 2011; abstract; p. 5; "C. Impact of Range Expansion on Fairness".

3GPP TR 36.902 V9.3.1 (Mar. 2011) 3rd Generation Partnership Project; Technical Specification Group Radio Access Network; Evolved Universal Terrestrial Radio Access Network (E-UTRAN); Self-configuring and self-optimizing network (SON) use cases and solutions (Release 9) (21 pages).

3GPP TS 36.420 V10.1.0 (Jun. 2011) 3rd Generation Partnership Project; Technical Specification Group Radio Access Network; Evolved Universal Terrestrial Radio Access Network (E-UTRAN); X2 general aspects and principles (Release 10) (6 pages).

3GPP TS 36.421 V10.0.1 (Mar. 2011) 3rd Generation Partnership Project; Technical Specification Group Radio Access Network; Evolved Universal Terrestrial Radio Access Network (E-UTRAN); X2 layer 1 (Release 10).

3GPP TS 36.422 V10.1.0 (Jun. 2011) 3rd Generation Partnership Project; Technical Specification Group Radio Access Network; Evolved Universal Terrestrial Radio Access Network (E-UTRAN); X2 signalling transport (Release 10) (8 pages).

3GPP TS 36.423 V10.2.0 (Jun. 2011) 3rd Generation Partnership Project; Technical Specification Group Radio Access Network; Evolved Universal Terrestrial Radio Access Network (E-UTRAN); X2 application protocol (X2AP) (Release 10) (130 pages).

* cited by examiner

METHODS AND APPARATUS FOR INTERFERENCE MANAGEMENT

CROSS-REFERENCE TO RELATED APPLICATIONS

This patent application claims priority under 35 U.S.C. §119(e) from Provisional Patent Application Nos. 61/540,697 and 61/540/752, both filed Sep. 29, 2011, the disclosure of each of which is incorporated by reference herein in its entirety.

FIELD OF THE INVENTION

The present invention relates generally to wireless communication. More particularly, the invention relates to systems and techniques for management of interference and loading between cells.

BACKGROUND

One of the greatest problems facing wireless network operators is the need to serve large numbers of customers with varying needs using the infrastructure available to them. Numerous considerations affect the number of customers that may be served by a particular set of resources, and constant efforts are being directed toward improvements in efficiency. One important consideration in maximizing efficiency is the allocation of loading between cells. One important mechanism for allocation of loading is management of interference.

One important type of cell combination calling for proper management of interference is a combination of heterogeneous cells, such as macro and pico cells. A number of pico cells may operate within the boundaries of a macro cell, and the proximity of macro and pico base stations, such as macro and pico eNBs, calls for appropriate management of interference.

SUMMARY OF THE INVENTION

Figure 1:
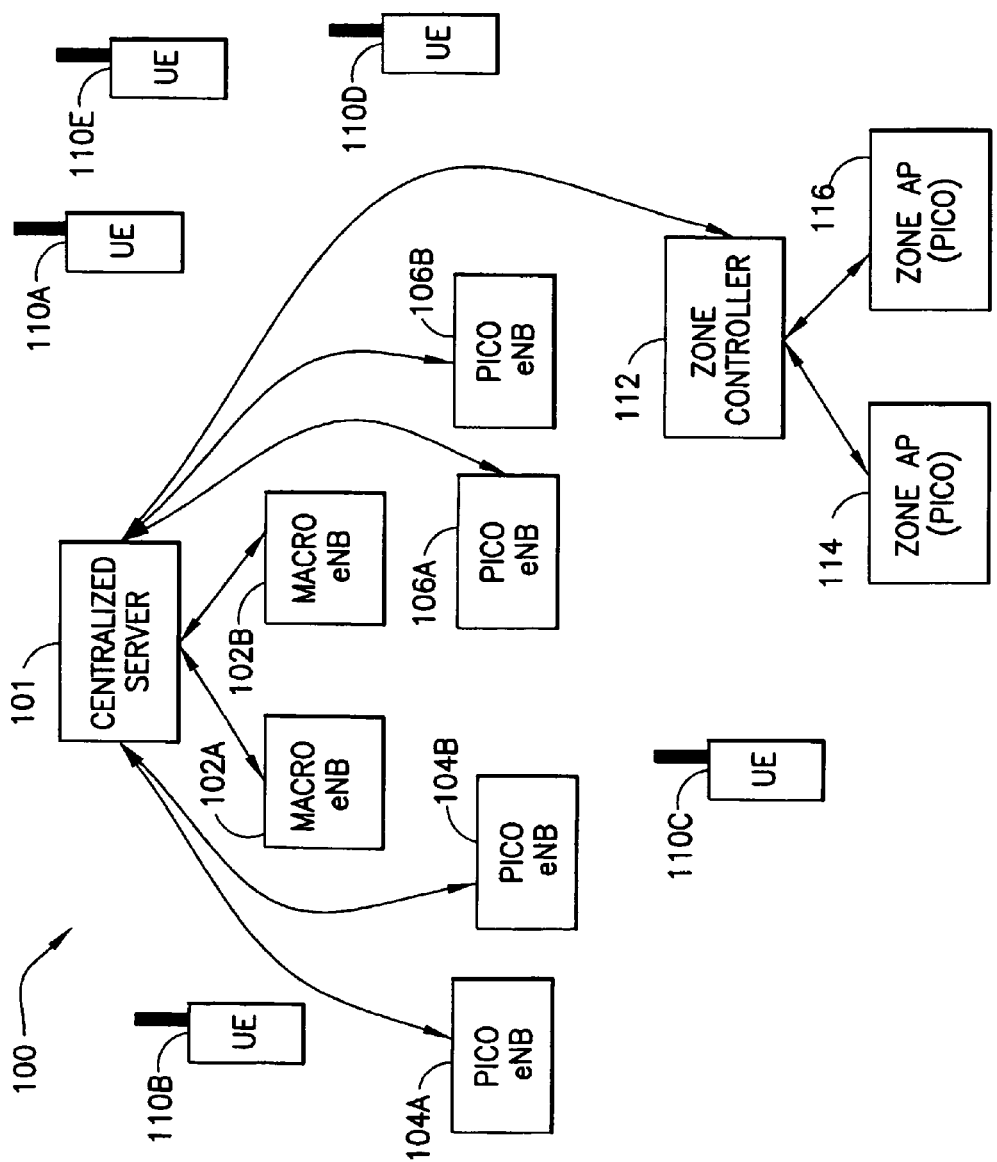
FIG. 1 illustrates a network configuration according to an embodiment of the present invention.

According to an embodiment of the invention, an apparatus comprises memory, at least one processor, and a program of instructions, configured to, with the memory and the at least one processor, configure the apparatus to perform actions comprising at least monitoring load metric information relating to loads affecting one or more nodes of a network, updating almost blank subframe proportioning based on the load information and scheduling load metric calculation based on the updated almost blank subframe proportioning.

DETAILED DESCRIPTION

Various embodiments of the present invention recognize that in many cases, macro and pico cells operate in the same geographic area, so mechanisms have been implemented wherein the interference caused by one cell to another is artificially reduced at certain times. One such mechanism is time-division—enhanced intercell interference coordination (TDM-eICIC, otherwise known as eICIC or Enhanced Inter-Cell Interference Coordination), described in 3GPP Release 10. In this approach, a macro cell, that is, a macro eNodeB (also known as eNB or base station) uses almost blank subframes (ABS) to provide for the use of large range extension by pico cells. Such range extension enhances the ability to offload UEs in the macro cell to underloaded pico cells. That is, even if ordinarily the conditions experienced by the UE in the pico would be too poor to warrant handover of the UE from the macro cell to the pico cell, the use of the ABS allows the UEs to experience sufficiently good conditions for a portion of the time, thereby enabling such handover to be feasible. In such cases, and in others, a primary benefit from handover operation is load management. Rather than performing a handover simply when service would otherwise be unacceptable if no handover were performed, handover may, in many cases, be performed in order to increase overall throughput by lightening the load on one cell by transferring UEs to another cell with spare capacity. Embodiments of the present invention recognize that mechanisms exist that are specifically adapted to manage loading management between macro cells and pico cells. Embodiments of the present invention further recognize that coordinating load management with scheduling provides important advantages because scheduling is one mechanism by which loads are allocated between network elements. Therefore, embodiments of the present invention determine handover thresholds based on load estimates that are associated with scheduling mechanisms, such as a proportional fair (PF) scheduler. Such determinations may include embodiments directed to the use of eICIC with ABS. Once made, load determinations made at one cell may be conveyed to neighbor cells through appropriate mechanisms, at least one of which may include use of standard information elements (IEs) in 3GPP X2 messages. Reference may be made to the X2 interface defined in the Third Generation Partnership Project (3GPP) standards, for example, 3GPP TS 36.420—Evolved Universal Terrestrial Radio Access Network (E-UTRAN); X2 general aspects and principles, 3GPP TS 36.421—Evolved Universal Terrestrial Radio Access Network (E-UTRAN); X2 layer 1, 3GPP TS 36.422—Evolved Universal Terrestrial Radio Access Network (E-UTRAN); X2 signaling, and 3GPP TS 36.423—Evolved Universal Terrestrial Radio Access Network (E-UTRAN); X2 application protocol (X2AP), and such signaling mechanisms can be used to communicate load information between cells. Determinations and exchange of load information may in turn be used to compute handover thresholds, which may then be distributed for use to UEs being served by a cell and to neighbor eNBs serving neighboring cells.

In TDM-eICIC with ABS, the proportion of ABS subframes used by a macro cell is important, so as to avoid excessive sacrifice of capacity on a macro eNB, while minimizing interference to a pico eNB. The proportion of ABS subframes, also known as ABS ratio or ABS fraction, represents the fraction of subframes in which a macro eNB employs almost blank subframes in order to minimize the interference to pico eNBs. The ABS proportion may be substantially the same at multiple eNBs, or may be different at different eNBs. The ABS proportion employed by a macro eNB is typically known to the pico eNBs that are subject to interference from the macro eNB. In addition, because the UEs in the pico cells may experience different interference conditions within the ABS portion (wherein the macro eNB uses almost blank subframes to reduce interference) and the non-ABS portion (wherein the macro eNB does not use almost blank subframes), the pico cell UEs may provide additional feedback to the pico-eNB to represent the channel and interference conditions within the ABS and non-ABS portions separately. Such feedback may represent the UE's observed channel and interference conditions relative to its serving cell, or relative to a neighbor cell. According to the 3GPP release 10 specification, one "measurement restriction subset" can be configured for measurements to be made by the UE on a given neighbor cell, so that a UE would measure a neighbor cell only in a specified, or restricted, set of subframes. Suppose, then, that a UE is to be configured to take measurements from a neighbor pico cell. The UE may be configured to measure a neighbor pico cell only within the ABS portion of the pico cell. Conversely, if a UE is to be configured to make measurements for a neighboring macro cell, it may be configured to restrict its measurement to just the subframes where the neighboring macro cell does not employ ABS. For measurements to be made by a UE on its own serving cell (rather than on a neighbor cell), the 3GPP release 10 specification allows configuring two measurement restriction subsets. That is, the UE may be configured to make two separate sets of measurements, each corresponding to the channel quality experienced by the UE in a specified set of subframes. For measurements to be made by a UE connected to a pico cell for its own serving picocell, these two measurement restriction subsets will typically be configured such that one measurement restriction set is a subset of the ABS portion of the picocell, while the second measurement restriction set is a subset of the non-ABS portion of the picocell.

The pico eNB's scheduler may make use of such feedback to determine whether to provide allocations to the UEs within the ABS portion or the non-ABS portion. Depending on the channel state and interference information and the distribution and number of UEs in the cell, some UEs may receive allocations largely within the ABS portion and other UEs may receive allocations largely within the non-ABS portion. Systems and techniques according to embodiments of the present invention coordinate adaptation of ABS subframes to balance load between macro and pico cells. The idea of "load" is associated with scheduler behavior, that is, with the management of allocation of resources to different user devices, such as user equipments (UEs). Systems and techniques according to embodiments of the present invention therefore manage the proportion of ABS subframes, and may also interwork with methods that adapt thresholds for handover based on load, in a way consistent with scheduling that manages the allocation of resources to UEs in macro and pico cells considering the channel state feedback provided by UEs and the use of ABS.

Along with adapting a proportion of ABS subframes, systems and techniques of the present invention also provide for specific patterns of blank subframes. Embodiments of the present invention therefore perform actions comprising:

Maintaining and updating proportioning of ABS subframes;

Signaling, which may include one or more of centralized or distributed signaling, to exchange proportional-fair based load metrics between network elements, such as between network nodes, which may be represented by macro and pico eNBs;

Notifying network nodes of updated ABS patterns.

The adaptation of ABS proportions can be embodied in a distributed way, or at a centralized controller or centralized server.

The load metric may suitably be a PF metric, providing for a long-term average of scheduled UEs. This metric may be or may incorporate a weighted PF metric, including weights for quality of service class identifiers (QCIs) of different bearers associated with different quality of service (QoS) requirements.

FIG. 1 illustrates a network 100 suitably operating according to an embodiment of the present invention. The network 100 suitably comprises a centralized server 101, connected to macro eNBs 102A and 102B. The network 100 also comprises pico eNBs 104A and 104B, operating in the vicinity of the macro eNB 102A, and pico eNBs 106A and 106B, operating in the vicinity of the macro eNB 102B. The centralized server 101 is also connected to the pico eNBs. The macro eNBs 102A and 102B are connected to one another through an X2 connection, and the pico eNBs are also connected to their macro eNBs through an X2 connection. The network 100 further comprises UEs 110A-110E, distributed about the various eNBs and being attached to various ones of the eNBs at different times.

The network 100 also comprises a zone controller 112, and pico zone access points (APs) 114 and 116. The purpose of the zone controller may be to provide local control and management functionality for the pico zone access points. The zone controller 112 may collect metrics for all APs under the controller, and may then report either all the individual AP metrics to neighboring macros or the centralized server, or a subset of AP metrics, or may report a consolidated metric representing a cluster of picos. When selecting a subset of AP metrics, the controller may use knowledge of the topology of a cluster of picos. For example, if the cluster of cells consists of "interior cells" and "periphery cells", the UEs from the macro will likely first hand over to one of the periphery cells rather than to the interior cells. In this case, the zone controller may report only the metrics for the periphery cells in the pico cluster to the macro eNB or centralized controller.

Embodiments of the invention may compute a load metric based on proportional fair scheduling, and then determine handover threshold using the load metric, as discussed below.

Figure 2:
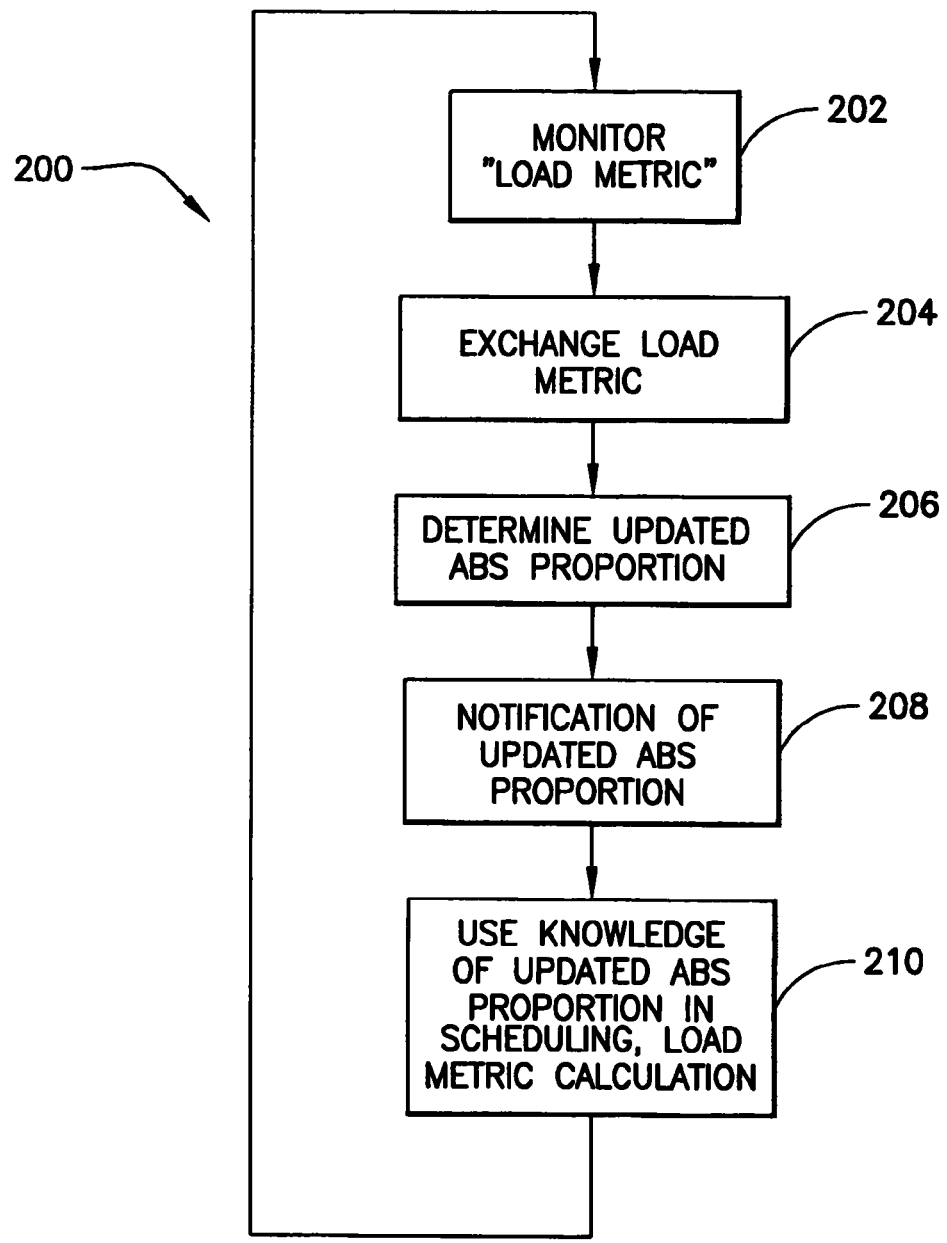
FIG. 2 illustrates a process according to an embodiment of the present invention.

FIG. 2 illustrates a process 200 of ABS proportion management according to an embodiment of the present invention. ABS proportion management may suitably determine the proportion of ABS subframes to be allocated between network nodes, such as between a macro node and its neighboring pico nodes. Such ABS proportion management suitably comprises updating proportion information relating to ABS subframes at a network node, signaling to exchange a load metric that may suitably be a proportional fair-based load metric, and notifying other network nodes of the updated ABS pattern. ABS proportion adaptation according to various embodiments of the invention may be performed in a distributed way or at a centralized controller or centralized server.

At step 202, load information for a cell of a wireless network is monitored. The monitoring may be accomplished by an eNB and may involve measurements by the eNB or measurements by UEs or other devices reported to the eNB. The load information may comprise, or may be used to compute, one or more load metrics. The load metric or metrics may be weighted proportional fair metrics of scheduled UEs, with the metrics suitably comprising long term averages over an appropriate time scale. Appropriate weightings may be used for loads, such as using appropriately selected weights for QCIs of different bearers.

The load information may be monitored for a number of cells by the eNBs, or by the devices serving or otherwise operating in the cells. At step 204, load information may be exchanged between neighboring eNBs, or between the eNBs and a centralized server. The exchange may be accomplished, for example, over an X2 connection to neighbor eNBs, using appropriate indications, such as an information element (IE) designed to indicate load status. The load metric might be conveyed, for example, through the "composite available capacity" IE described in the X2 Resource Status Update message described in the 3GPP standard. This IE has been defined as an integer between 0 and 100 representing "available capacity" in the cell, which may be interpreted as the fraction of resources that a new user handing over to the cell may receive. Various embodiments may express load in a cell based at least in part on the PF metric, by equivalently expressing it as a percentage of available capacity. In general as the load metric in the cell goes up, the percentage of available capacity reduces.

At step 206, an updated ABS proportion is determined, suitably based on a PF metric based load. ABS adaptation may suitably be accomplished by following a rule to set a new ABS value $a_{new}=a+\Delta a$ if $a \leq f(a;v_a;v_{na};v_M)$, and $a-\Delta a$ otherwise, where the terms used in the equation are as follows:

a=current value of the ABS proportion $v_M(m)$=load (PF) metric in macrocell m, wherein the macrocell index m may take values from 1 to M. This typically represents the load experienced by the macrocell within the non-ABS subframes of the macro-cell, since the macrocell does not allocate substantially any resources within the ABS subframes.

$v_a(p)$=load (PF) metric in ABS portion of pico cell p wherein the picocell index p may take values from 1 to P $v_{na}(p)$=load (PF) metric in non-ABS portion of picocell p wherein the picocell index p may take values from 1 to P.

$f(a; v_a; v_{na}; v_M)$ is a function that expresses a desired target proportion of ABS subframes as a function of the current value a of the ABS proportion, and the various load (PF) metrics as described above.

An observation in this regard is that typically the load (PF) metric $v_a$ in the ABS portion of a pico-cell may be different from the load (PF) $v_{na}$ metric in the non-ABS portion of the pico-cell. This is an inherent property of schedulers such as the PF scheduler, which try to trade off the spectral efficiency achievable by scheduling UEs in good channel conditions with fairness considerations so that UEs do not experience too poor performance. As noted above, depending on the channel state and interference feedback received from UEs, and the distribution and number of UEs in the cell, some UEs may receive allocations largely within the ABS portion and other UEs may receive allocations largely within the non-ABS portion. For example, the load (PF) metric $v_a$ in the ABS portion of a pico cell may be proportional to the number of users that receive allocations substantially within the ABS subframes in the picocell, and the load (PF) metric $v_{na}$ in the non-ABS portion of a pico cell may be proportional to the number of users that receive allocations substantially within the non-ABS subframes in the picocell. Further, the load (PF) metric $v_a$ in the ABS portion of a pico-cell may be inversely proportional to the proportion a of ABS subframes, while the load (PF) metric $v_{na}$ in the non-ABS portion of a pico-cell may be inversely proportional to one minus the proportion a of ABS subframes. Thus the relative values of $V_a$ and $v_{na}$ will in general depend on the distribution of channel conditions of the UEs within the pico cell, and on the ABS proportion experienced by the pico cell.

The function $f(\,)$ identifies a target value to which the current value a of the ABS proportion should be ideally adapted. However, given the complex dynamic nature of the cellular system, it may not be desirable to directly adapt the ABS proportion to the ideally desired value. Instead, it is often more advantageous to increment or decrement the current value by small steps. Thus if the target value is larger than the current value, then the current value should be increased by a step size, otherwise it should be decreased. The step size $\Delta a$ may be chosen to ensure stability of the system, for example to ensure that the adaptation does not cause the system overshoot the intended target value. In an embodiment, the value of $\Delta a$ may be constant, or in other embodiments it may be variable. For example $\Delta a$ may depend on the difference between the desired target value determined by the function $f(\,)$ and the current value a. In other embodiments, the step size to be used when positively adapting the current value may be different than the step size used when negatively adapting the current value.

The function $f(\,)$ may preferably be an increasing function of the load metric $v_a(p)$ in the ABS portion of a given pico cell p. It may preferably be a decreasing function of the load metric $v_{na}(p)$ in the non-ABS portion of a given pico cell p, as well as a decreasing function of the load $v_M(m)$ in the non-ABS portion of a given macro cell m.

A specific form of the function $f(\,)$ is as follows:

$$f(a; v_a; v_{na}; v_M) = \frac{\frac{a}{1-a} \sum_{p=1\ldots P} v_a(p)}{\frac{a}{1-a} \sum_{p=1\ldots P} v_a(p) + \sum_{p=1\ldots P} v_{na}(p) + \sum_{m=1\ldots M} v_m(m)}.$$

In an embodiment, the quantity a times $v_a(p)$ is a measure of the number of UEs receiving the majority of their allocations within the ABS portion of the pico-cell p, whereas the quantity (1-a) times $v_{na}(p)$ is a measure of the number of UEs receiving the majority of their allocations within the non-ABS portion of the pico-cell p, and the quantity (1-a) times $v_M(p)$ is a measure of the number of UEs receiving allocations in the macro-cell M. In an embodiment, the function f may represent the fraction of the UEs in the system that are connected to a pico-cell and are receiving the majority of their allocations within the ABS portions of the pico-cells to which they are connected, relative to the total number of UEs in the system.

At step 208, upon updating the ABS proportion, one or more selected macro and pico cells, or eNBs, are notified of the updated proportion, suitably using an X2 connection, either by other macro or pico eNBs or by a centralized server. Typically these will be either macro eNBs that will apply an ABS pattern corresponding to the updated proportion, and pica $UE_s$ that are interfered by those macro eNBs. Further, a set of UEs in the cells where the ABS proportion is updated, may also be notified due to the update. The notification may be accomplished using existing signaling mechanisms, such as RRC reconfiguration. The purpose of this notification is typically to inform the UEs to update the measurement restriction subsets described above, so that the UEs may suitably provide measurements corresponding to their channel and interference conditions within the ABS portion separately from the conditions within the non-ABS portion, Similar measurement restriction subsets may be provided for measurements to be made by the UEs for the signal quality received from neighboring eNBs. At step 210, the various eNBs use knowledge of the updated ABS information in their scheduling and resource allocation operations and in load metric calculation.

Figure 3:
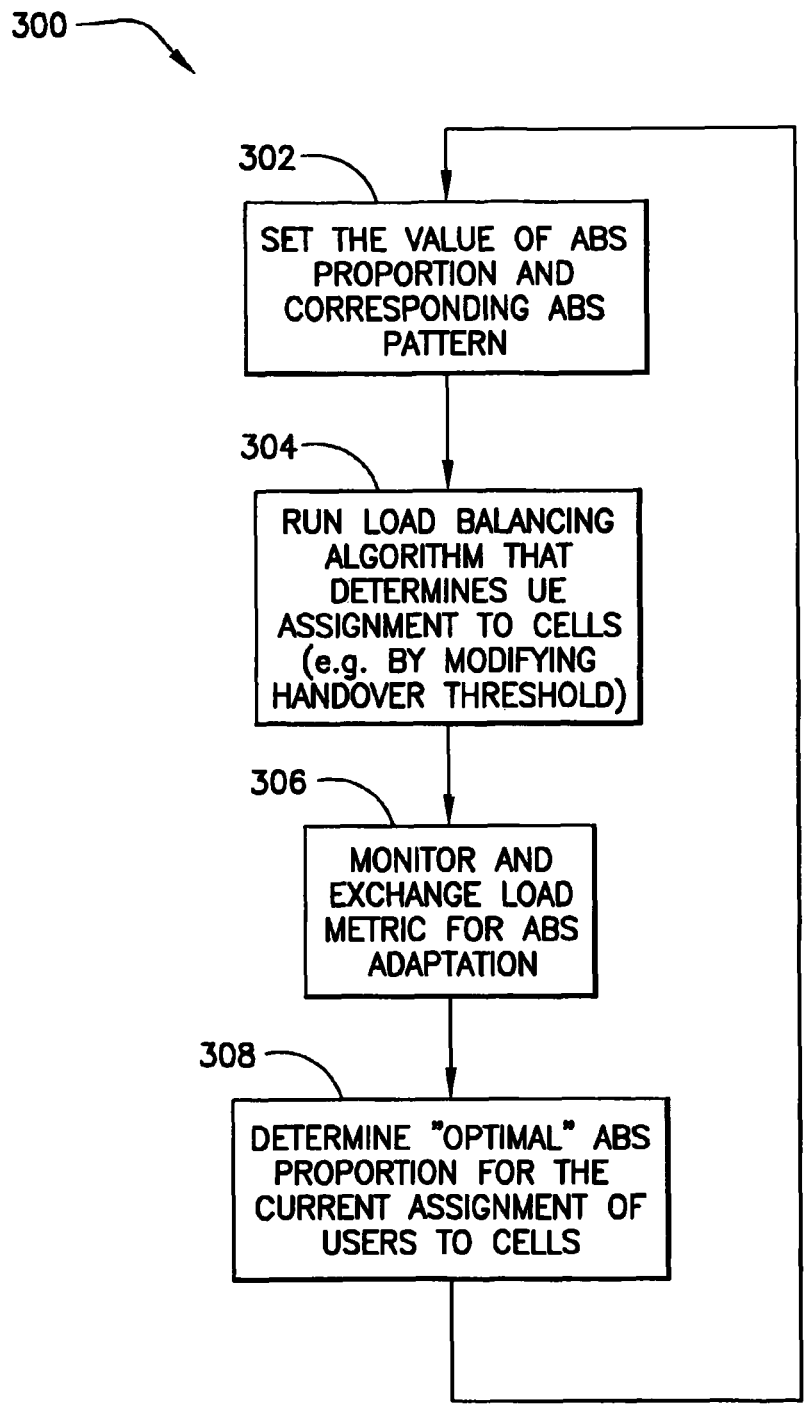
FIG. 3 illustrates a process according to an embodiment of the present invention.

FIG. 3 illustrates a process flow 300 showing details of ABS optimization according to an embodiment of the present invention. Mathematically, the problem of finding the "optimal" ABS proportion can be posed as a utility maximization problem. Suitably, an ABS ratio is set so as to maximize a global utility that may be based on the sum of the utilities of users in all cells, including macro and pico cells, for a given association of users to macro and pico cells. For a given association of users to macro and pico cells, a solution can be found for the optimal value of an ABS proportion a. The formula $f(\ )$ presented above corresponds to the optimal solution when the utility function is the logarithm function $\log(\ )$. It should be recognized that substantially any appropriate utility function may be employed, and the formula $f(\ )$ may be modified accordingly. Typically, to attain the optimal of such a utility function, each cell implements a proportional fair scheduler. So this optimal value of the ABS proportion corresponds to the optimal value for a given distribution of the load (PF) metrics in the various cells, including (in the case of pico cells) the metrics within the ABS portion and the non-ABS portion. The process 300 suitably iteratively combines the adaptation of ABS proportion with an appropriate load-balancing mechanism in order to move toward a global optimum.

At step 302, an ABS ratio is selected.

At step 304, an allocation of UEs to cells is determined, for example, by performing load balancing. Load balancing may be suitably accomplished by modifying a handover threshold. This involves modification of thresholds for handover based on the observed loads corresponding to the updated ABS ratio, and will result in UEs handing over from one cell to another cell based on the modified handover thresholds.

At step 306, load metric information is monitored and exchanged between cells for ABS adaptation, and at step 308, an optimal ABS is determined for the current assignment of cells to users. The process is repeated iteratively, adjusting cell assignments and ABS proportions until a stopping criterion is met, such as iteration through a predetermined number of rounds, achieving a predetermined goal, or reaching a diminishing rate of improvement.

Figure 4:
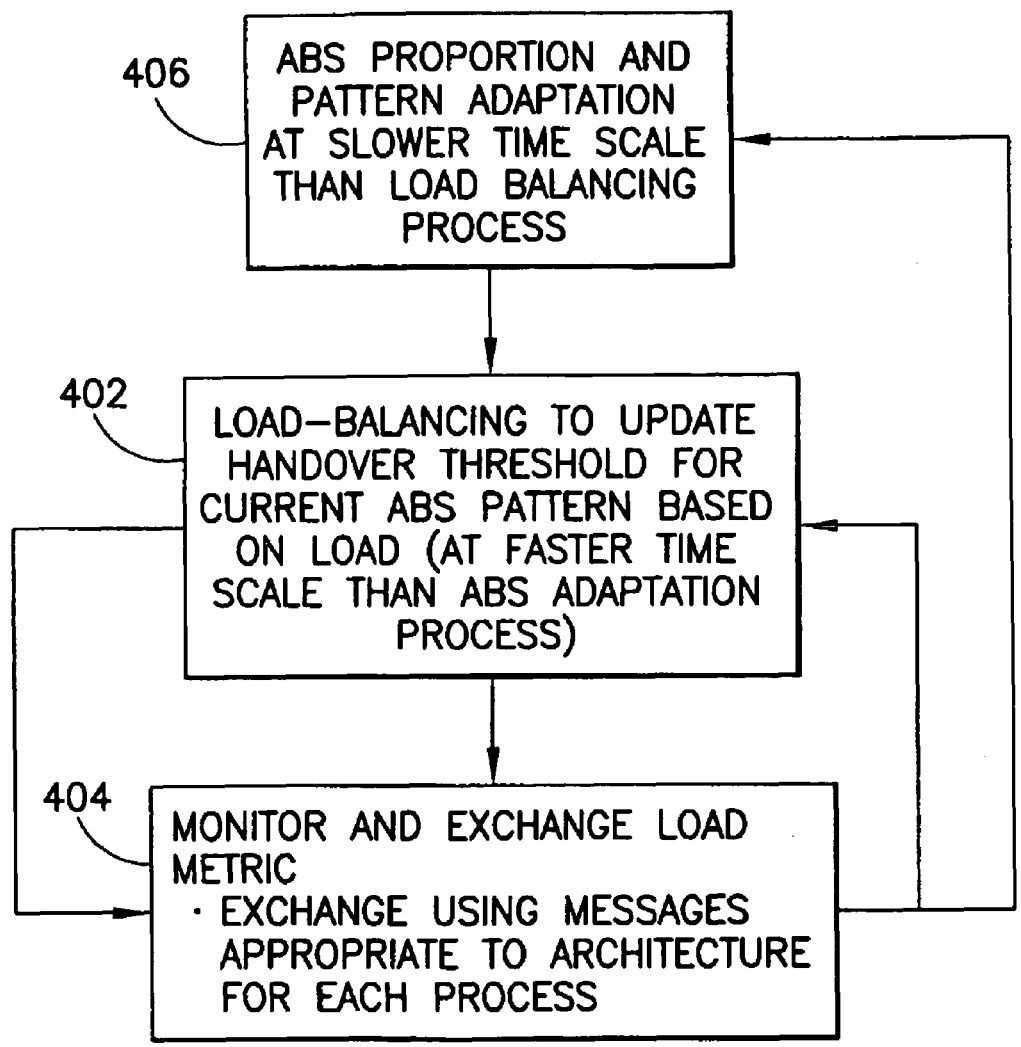
FIG. 4 illustrates a process according to an embodiment of the present invention.

In an embodiment, the load balancing process and ABS adaptation process may run iteratively as two loops at different time-scales, as illustrated in FIG. 4. The load-balancing process may appropriately modify the handover threshold between cells by suitably incorporating the load information, in order to evenly distribute the load between cells. In the context of pico-cells using eICIC and ABS, modification of the handover threshold is also known as range extension. Thus the load-balancing process may adaptively determine a range extension value taking into account the load in the various cells. The load-balancing process in step 402 may run as an inner loop at a faster timescale, while the ABS adaptation process in step 404 may run as an outer loop at a slower timescale. The load-balancing process 402 would try to adapt the handover thresholds in order to balance the distribution of loads in the various cells optimally corresponding to the current value of the ABS proportion as set by the ABS adaptation process 404. At a slower time-scale, the outer loop ABS adaptation process 404 would update the ABS proportion and pattern, and the inner loop 402 would then try to modify the handover thresholds to optimally correspond to the updated ABS proportion and pattern. The step 406 corresponds to the operations of scheduling, resource allocation, and measurement of the load given the handover thresholds adapted by the load balancing process 402 and the ABS adaptation process 404.

Returning now to the configuration of FIG. 1, the centralized server 101 may coordinate the adaptation of an ABS pattern. The macro and pico eNBs may convey the load metric to the server 101. The pico cells may convey the load metric directly to the server 101, or may convey the metric to the macro cells by X2 signaling, and the macro cells may relay the information received from the pico cells to the server 101. In one embodiment of the invention, each pico conveys two metrics: one representing the load (PF) metric in the ABS portion of the pico, ($v_a$) and one representing the load (PF) metric in the non-ABS portion of the pico ($v_{na}$). The macro eNB provides a value for its load (PF) metric, $v_M$. The centralized server 101 determines an updated ABS proportion and selects an appropriate ABS pattern, which is then conveyed to the macro eNBs. The server 101 may communicate directly with the pico eNBs, or the server 101 may communicate the pattern to the macro eNBs and each macro eNB may convey the pattern to the pico eNBs operating in its vicinity. The determination of the updated ABS proportion pattern may be performed by the centralized server for a single macro cell and pico cells neighboring the single macro, or for a group of macro cells and the pico cells neighboring some macro cell in the group of macro cells.

In the specific configuration shown, the zone controller 112, which provides local control and management functionality for a set of access points, may collect the metrics for all of the access points (APs) 114 and 116 associated with the controller 112. The controller 112 may then report all of the individual AP metrics to the server 101, or may report a subset of AP metrics, or may report a consolidated metric representing a cluster of pico cells. In some embodiments, the zone controller may report the metrics to the macro eNBs that are neighbors of the pico access points controlled by the zone controller. The protocol for exchanging the load metrics and informing the eNBs of the updated ABS pattern may involve the use of 3GPP X2 IEs. Alternative mechanisms not conforming to the 3GPP X2 standard but representing substantially similar information may also be used. Macro and pico eNBs may perform load balancing computations in order to adjust a handover threshold, together with the ABS pattern.

Figure 5:
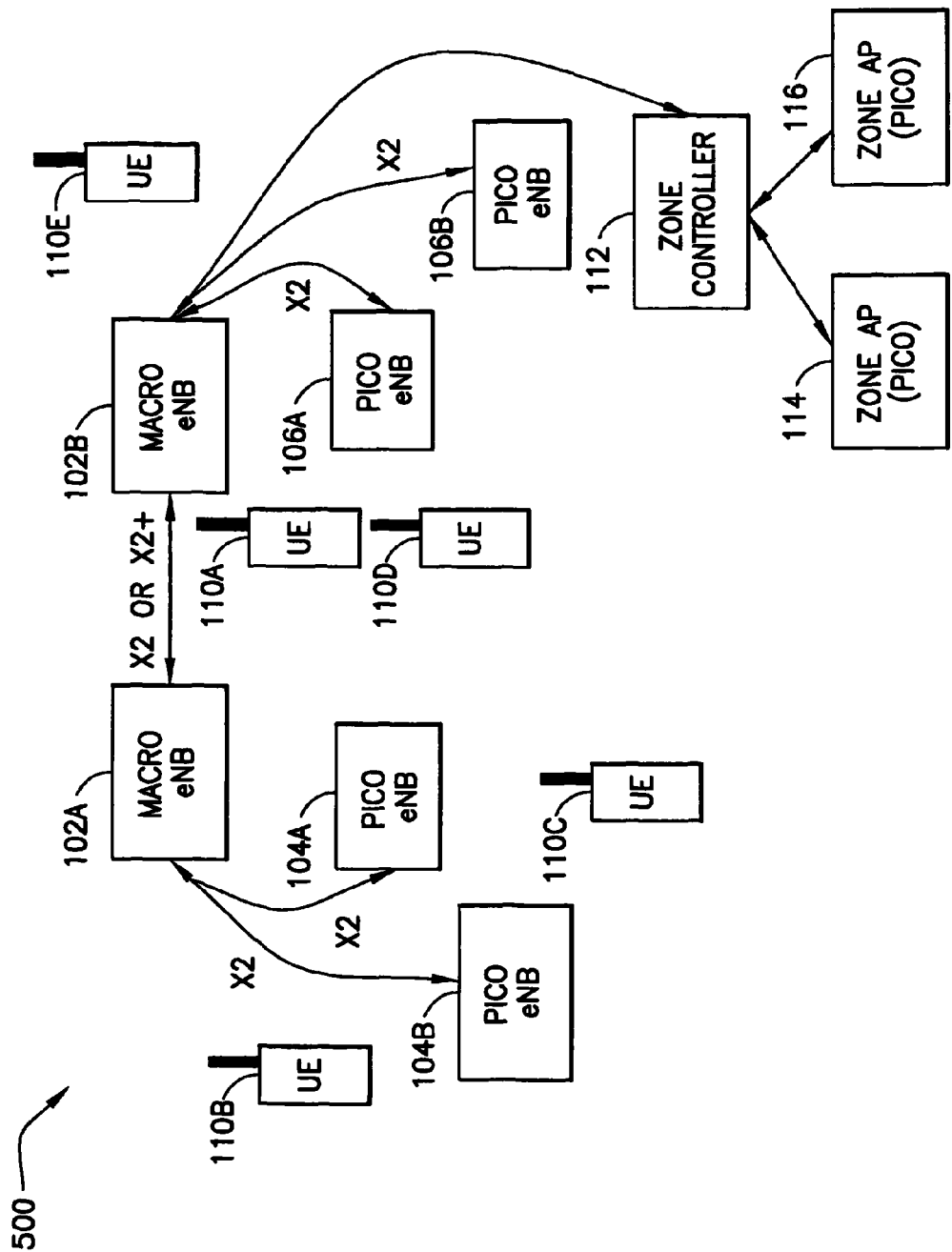
FIG. 5 illustrates a network configuration according to an embodiment of the present invention.

FIG. 5 illustrates an alternative configuration 500 according to an embodiment of the present invention. In this alternative configuration, the central server 101 is not present, but the remaining elements illustrated in FIG. 1 are shown. In this configuration, the macro and pico eNBs exchange load metrics among themselves. In one exemplary embodiment, each macro eNB makes its own local decision regarding ABS proportion determination and pattern selection, taking into account neighbor macro and pico measurements. ABS determination and pattern selection would be applied not over the entire network, but within a "local set" of cells. In an embodiment, the local set of cells considered by a macro eNB when making the decision may be restricted to the macro cell comprising the eNB and the pico cells neighboring the macro cell. In other embodiments, the local set considered by a macro eNB when making the decision may include neighboring macro cells as well. In other embodiments, the pico eNBs may also participate in determination of the ABS proportion and pattern selection. Information may be exchanged, for example, using 3GPP X2 IEs, such as a "composite available capacity" IE. The various network elements may be configured to interpret the IE using their own specified proprietary interpretations in some embodiments. In some embodiments wherein a pico eNB has multiple neighboring macro cells, the pico eNB may receive ABS patterns determined separately by the multiple neighboring macro eNBs, which may in general not align with each other. The pico cell may then select an appropriate set to use as the ABS based on the ABS patterns applied at the different macro neighbor eNBs, such as choosing the ABS pattern of its strongest neighbor, or choosing a common subset of the ABS patterns proposed by different neighbors. The pico eNB may then inform the macro neighbors of the ABS pattern it is applying. Each such macro eNB may then take this information into account when determining its updated ABS proportion and pattern. Further, the pico eNB may convey additional information regarding the efficacy of the ABS pattern employed, which may be also used in updating the ABS proportion and pattern. For example, this information may consist of a percentage value representing the resources in the ABS portion relative to the proportion of UEs worthy of protection from interference from ABS. One such information element is expressed in the 3GPP standard X2 interface as a Downlink ABS Status Information Element (IE). An embodiment conveys the ratio of the current ABS proportion to the fraction of UEs currently receiving allocations substantially within ABS as a percentage. Through such information, the ratio of the load (PF) metric in the non-ABS portion of the pico to the load (PF) metric in the ABS portion of the pico (referred to earlier as $v_{na}$, and $v_a$) may be inferred and used in determining the updated ABS proportion.

In another exemplary embodiment, the macro eNBs may exchange modified messages with their neighbor macro eNBs that encapsulate the metrics of their own neighbor pico eNBs as well as macro load information. This exchange may suitably implemented as an extension of the X2 interface, suitably referred to as X2+, and may, for example, use new information elements or information elements modified in one way or another from those used by the X2 interface. The use of the modified message is directed toward facilitating a common ABS proportion that is applicable to a set of macro eNBs beyond the local neighborhood of any single macro eNB.

If another architecture using a zone controller such as the controller 112 is employed, the zone controller may suitably collect the metrics for all APs under the controller. The controller may then report either all the individual metrics to neighboring macro eNBs, or a subset of AP metrics, or may alternatively report a consolidated metric representing a cluster of pico eNBs.

Once an ABS proportion has been determined, it is necessary to select a specified pattern of subframes that are to be muted, so that the proportion of muted/blank subframes in the pattern followed the desired proportion. The updated pattern will have to be signaled to the UEs in the form of updated measurement restriction subsets, since, as described above, the UEs may make measurements on the serving eNB restricted to certain subframes to represent the channel quality in the ABS subframes, and measurements restricted to other subframes to represent the channel quality in the non-ABS subframes. Due to processing and signaling capacity restrictions, it may not be possible to signal all the UEs all at once. It is, therefore, preferable that the set of subframes designated as ABS subframes in the updated pattern have as little mismatch as possible from the set of subframes designated as ABS subframes in the previously applied pattern. One way of minimizing the mismatch is to ensure that, if the new ABS proportion is larger than the previous proportion, the new ABS pattern should be a superset of the previous pattern. Conversely if the new ABS proportion is smaller than the previous proportion, the new ABS pattern should be a subset of the previous pattern.

The use of such an approach helps to insure that even if there is a delay in notifying some of the UEs of the updated pattern, the degradation in performance due to measurement errors will not be severe, because the UEs will experience a mismatch between their expected pattern and the true pattern in only a small number of subframes.

In a distributed embodiment, such as in the configuration illustrated at FIG. 4, each macro eNB may choose its own ABS proportion based on its local neighborhood conditions. For this reason, there could be a mismatch between the ABS proportions chosen by two macro eNBs which are neighbors. Since the UE may make measurements on neighbor eNBs restricted to ABS or non-ABS portions, if the ABS pattern is changed, the UE may have to be notified through signaling to modify its measurement restriction subset for neighbor measurements. Otherwise there may be performance degradation due to inaccurate measurements owing to the mismatch. Again, to minimize the signaling load, it is desirable to reduce the amount of signaling required. Consequently it is beneficial to minimize the mismatch between ABS subframe patterns used in neighbor eNBs.

In order to accomplish such minimization of mismatches of ABS subframe sets between neighbor eNBs, as well as mismatches between the previous pattern prior to an update of the ABS pattern and the new pattern after an update, a "preferred order" of blanking subframes can be pre-assigned to all the eNBs. When a macro eNB needs to increase its ABS proportion, the macro eNB will choose a new pattern in which the set of additional blank subframes follow the preferred order of blanking. In some embodiments, the preferred order of blanking may correspond to providing protection from interference to successively larger number of instances of control channel transmissions for providing uplink grants (commonly known as Physical Downlink Control Channel, or PDCCH transmissions) and ack or nack messages (commonly known as Physical Hybrid ARQ Indication Channel, or PHICH) according to a certain periodicity. In an exemplary embodiment, a preferred order of blanking subframes may consist of successively additional blank subframes to cover the possible transmission instances of PDCCH uplink grants for a first uplink Hybrid ARQ process (corresponding to a periodicity of 1 in 8 subframes), the first and a second uplink Hybrid ARQ processes (corresponding to a periodicity of 2 in 8 subframes), three Hybrid ARQ processes including the first and second as well as a third Hybrid ARQ process (corresponding to a periodicity of 3 in 8 subframes), and so on. In some embodiments, it may be preferable to assign a particular preferred order to one set of cells, and a different preferred order to a different set of cells. For example, in systems wherein a single macro eNB may support multiple sectors by employing sectorized antennas oriented in different directions, it may be preferable to assign a first preferred order of blanking to the sector 1 of all neighboring eNBs, a second preferred order of blanking to the sector 2 of all neighboring eNBs, and so on. Sectors at the same macro eNB but oriented differently may interfere with each other near the edges of the sectors, thus assigning different a preferred blanking order to each sector may help mitigate the inter-sector interference as well. The use of such staggered patterns between sectors may be preferred if there are no pico eNBs that are interfered by multiple sectors from the same macro eNB, and may be less preferable otherwise. In an exemplary assignment of preferred blanking order for systems with 3-sector eNBs, the preferred blanking order of sector 1 may consist of successively including Hybrid ARQ processes 0,3,6,1,4,7,2,5, whereas the preferred blanking order of sector 2 may consist of successively blanking 1,4,7,2,5,0,3,6, and so on.

In a centralized embodiment, such as the environment illustrated in FIG. 1, the same ABS pattern can be applied to all eNBs following the update of the ABS proportion. Alternatively, different patterns can be signaled to different eNBs while still minimizing the mismatch between neighbor eNBs as in the distributed case discussed above. The preferred order can be applied in this case as well when updating the ABS pattern.

According to additional embodiments of the invention, which may be applied to both centralized and distributed configurations, the ABS pattern can consist of a static portion and a dynamically adapted portion. The static portion would be common to all cells, such as through a specific pattern designation for each cell, while each cell might adapt only the dynamic portion of the ABS pattern. The net result would be that the pattern used by a cell would be the union of the static portion and the dynamic portion. This net pattern would suitably be selected to be a subset or a superset of the previous pattern. In an embodiment, the static portion of the ABS pattern represents a common minimum subset of the ABS patterns. Conversely, a common minimum subset of the non-ABS patterns may also be identified. Thus even when the non-ABS subset shrinks or grows as the ABS subset is adapted, there may still be a common minimum of the non-ABS subframes which always remain non-ABS irrespective of the ABS adaptation. In an embodiment, the common minimum ABS subset would be provided to the UEs in the pico as the restriction subset over which channel state measurements corresponding to ABS are to be made, and the common minimum non-ABS subset would be provided to the UEs in the pico as the restriction subset over which channel state measurements corresponding to non-ABS are to be made. In an embodiment, the common minimum ABS subset may be chosen so as to provide protection from interference to transmissions of certain control messages, such as system information block (SIB) messages or other broadcast messages that are intended to reach UEs even in the weakest channel conditions. When it is desired to increase the set of ABS subframes beyond the common minimum ABS subset, the set of ABS subframes may be increased following a preferred order as mentioned earlier, by adding subframes corresponding to transmission instances of PDCCH uplink grants for successively larger number of uplink Hybrid ARQ processes in an exemplary embodiment. If the common minimum ABS subset is chosen to provide protection for broadcast transmissions such as SIB messages which typically happen at a fixed periodicity, some embodiments may apply a time offset between the macro and pico eNBs. If the macro's ABS subframes overlap with the macro's own broadcast message transmission instants, the macro eNB may not be able to transmit its own broadcast messages. Applying a suitable time offset (typically an integer number of subframes) would allow the macro eNB to transmit its own broadcast messages, while still using ABS subframes to provide the pico eNB interference protection at the instants when the pico's broadcast transmissions are to happen. In addition, the macro eNB may use partial blanking rather than almost blanking the entire subframe in order to provide the pico eNB protection for certain broadcast transmissions that happen only in a small portion of a subframe. Such broadcast transmissions comprise, for example, physical broadcast channel (PBCH) and primary and secondary synchronization signals (PSS, SSS). The macro eNB need only avoid transmitting in the small number of resource elements where the pico would transmit such signals. Concomitantly, the macro eNB may apply more conservative selection of modulation and coding schemes for its transmission during those subframes, to make up for the loss it would experience due to not transmitting in the resource elements corresponding to these signals.

Figure 6:
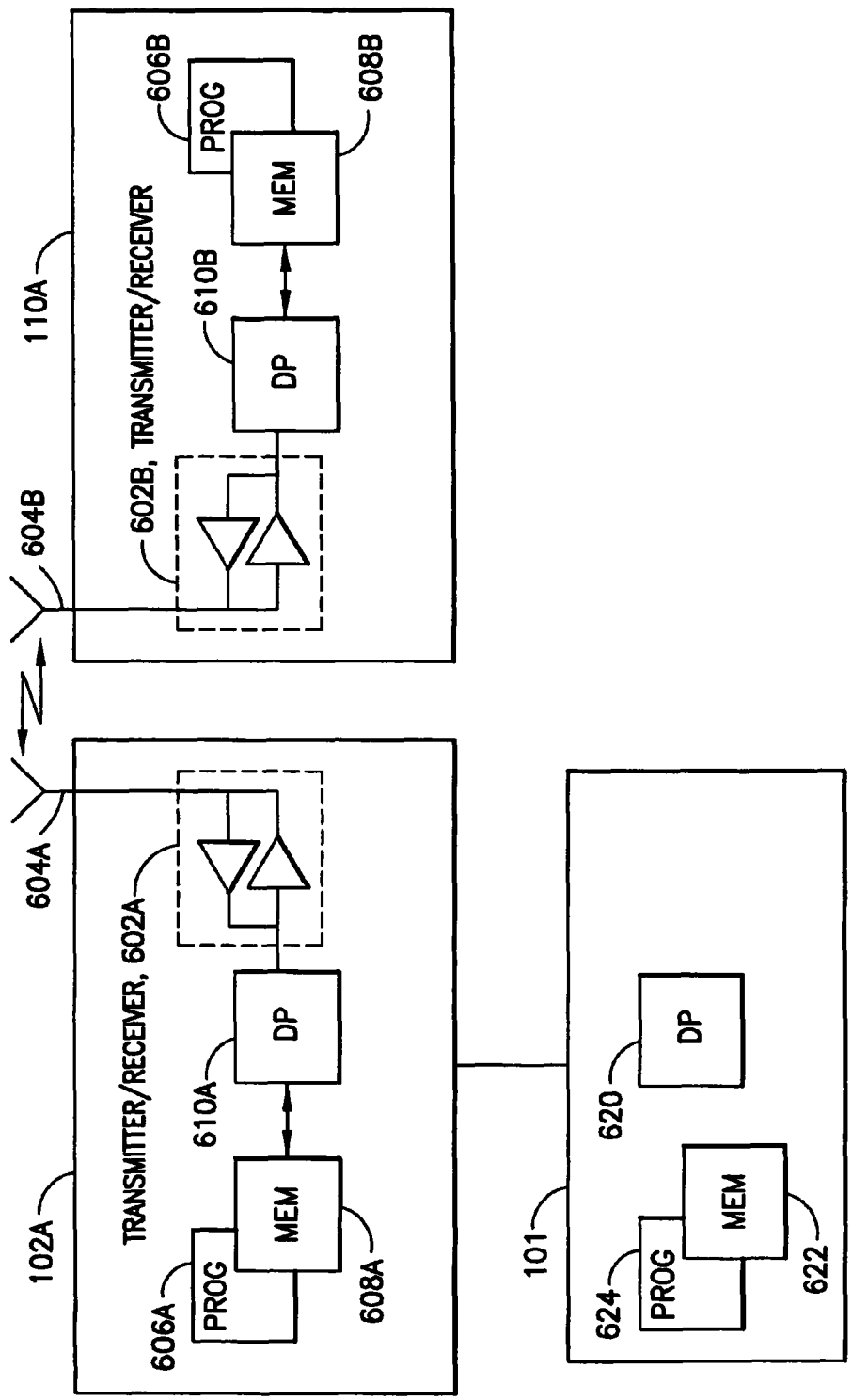
FIG. 6 illustrates details of a base station, a user equipment, and a central server according to an embodiment of the present invention.

Reference is now made to FIG. 6 for illustrating a simplified block diagram of details of an eNB such as the eNB 102A and a UE such as the UE 110A, as well as the central server 101.

The eNB 102A includes a suitable radio frequency (RF) transmitter and receiver 602A coupled to one or more antennas 604A for bidirectional wireless communications. The eNB 102A also includes a data processor (DP) 610A, and a memory (MEM) 608A that stores a program (PROG) 608A. The UE 110A also includes a transmitter and receiver 602B, antenna 604B, DP 610B, and MEM 608B that stores a PROG 606B. The central server 101 includes a suitable DP 620, MEM 622, and PROG 624.

At least one of the PROGs 606A, 606B, and 624 is assumed to include program instructions that, when executed by the associated DP, enable the electronic device to operate in accordance with the exemplary embodiments of this invention as was detailed above in detail.

In general, the exemplary embodiments of this invention may be implemented by computer software executable by the DP 610A of the eNB 102A and the other DPs, or by hardware, or by a combination of software and/or firmware and hardware. The interactions between the major logical elements should be obvious to those skilled in the art for the level of detail needed to gain an understanding of the broader aspects of the invention beyond only the specific examples herein. It should be noted that the invention may be implemented with an application specific integrated circuit ASIC, a field programmable gated array FPGA, a digital signal processor or other suitable processor to carry out the intended function of the invention, including a central processor, a random access memory RAM, read only memory ROM, and communication ports for communicating between the AP 12 and the UE 10 as detailed above.

In general, the various embodiments of the UE 110A can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 608A, 608B, and 622 may be of any type suitable to the local technical environment and may be implemented using any suitable data storage technology, such as semiconductor based memory devices, magnetic memory devices and systems, optical memory devices and systems, fixed memory and removable memory. The DPs 610A and 610B may be of any type suitable to the local technical environment, and may include one or more of general purpose computers, special purpose computers, microprocessors, digital signal processors (DSPs) and processors based on a multi-core processor architecture, as non-limiting examples.

At least one of the memories is assumed to tangibly embody software program instructions that, when executed by the associated processor, enable the electronic device to operate in accordance with the exemplary embodiments of this invention, as detailed by example above. As such, the exemplary embodiments of this invention may be implemented at least in part by computer software executable by the controller/DP of the eNB 102A or UE 110A or server 101, or by hardware, or by a combination of software and hardware. Various modifications and adaptations to the foregoing exemplary embodiments of this invention may become apparent to those skilled in the relevant arts in view of the foregoing description. While various exemplary embodiments have been described above it should be appreciated that the practice of the invention is not limited to the exemplary embodiments shown and discussed here.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

In addition, the various names used for the various parameters, such as $v_a$, $v_{na}$, and other parameters, are not intending to be limited in any respect, as these parameters may be identified by any suitable names. Further, the formulas and expressions that use these various parameters may differ from those expressly disclosed herein.

We claim:

1. An apparatus comprising:
    memory;
    at least one processor;
    a program of instructions, configured to, with the memory and the at least one processor, configure the apparatus to perform actions comprising at least:
    monitoring load metric information relating to loads affecting one or more nodes of a network comprising at least a first subset of nodes that employ almost blank subframes and a second subset of nodes; and
    updating almost blank subframe proportioning to create an updated proportioning based on the load metric information, wherein load metric information of at least one node in the second subset comprises load metric information relating to almost blank subframes;
    wherein updating almost blank subframe proportioning comprises:
        calculating a first sum of the load metrics pertaining to the first subset of network nodes;
        calculating a second sum of the load metrics of nodes in the second subset relating to almost blank subframes; and
        determining an updated almost blank subframe proportion as a function of the first sum, and the second sum.

2. The apparatus of claim 1, wherein load metric information of a node in the second subset relating to almost blank subframes is based on a number of users eligible for service by the node within almost blank subframes.

3. The apparatus of claim 2, wherein the load metric information of a node in the first subset is based on a number of users served by the node.

4. The apparatus of claim 1, wherein: load metric information of a node in the first subset is based on a proportionally fair metric of the node; and load metric information of a node in the second subset relating to almost blank subframes is based on a proportionally fair metric of the node averaged within almost blank subframes.

5. The apparatus of claim 1, wherein:
    updating almost blank subframe proportioning to create an updated proportioning based on the load metric information comprises determining a target almost blank subframe proportion based on the load metric information, determining a step size based on a difference between a current almost blank subframe proportioning and the target almost blank subframe proportioning; and
    creating an updated almost blank subframe proportioning based on the current almost blank subframe proportioning and the step size.

6. The apparatus of claim 5, wherein the target almost blank subframe proportioning is based on a ratio of the number of user devices that are connected to nodes in the second subset and are receiving allocations within subframes corresponding to almost blank subframes employed by at least one node in the first subset, to a total number of UEs.

7. The apparatus of claim 5, wherein the target almost blank subframe proportioning is based on a first sum of the load metrics pertaining to the first subset of network nodes and a second sum of the load metrics of nodes in the second subset relating to almost blank subframes.

8. The apparatus of claim 1, wherein the program of instructions is further configured to, with the memory and the at least one processor, configure the apparatus to perform actions comprising at least updating a handover threshold between a node in the first subset and a node in the second subset using load metric information relating to almost blank subframes.

9. The apparatus of claim 1, wherein the program of instructions is further configured to, with the memory and the at least one processor, configure the apparatus to perform actions comprising at least selecting an updated almost blank subframe pattern based on the updated almost blank subframe proportioning, wherein the set of almost blank subframes in the updated almost blank subframe pattern is at least one of a superset of the set of almost blank subframes in the current almost blank subframe pattern and a subset of the set of almost blank subframes in the current almost blank subframe pattern.

10. A method comprising:
    configuring at least one processor to cause an apparatus to perform actions comprising at least:
    monitoring load metric information relating to loads affecting one or more nodes of a network comprising a first subset of nodes that employ almost blank subframes and a second subset of nodes; and
    updating almost blank subframe proportioning to create an updated proportioning based on the load metric information, wherein load metric information of a node in the second subset comprises load metric information relating to almost blank subframes;
    wherein updating almost blank subframe proportioning comprises:
        calculating a first sum of the load metrics pertaining to the first subset of network nodes;
        calculating a second sum of the load metrics of nodes in the second subset relating to almost blank subframes; and
        determining an updated almost blank subframe proportion as a function of the first sum, and the second sum.

11. The method of claim 10, wherein updating almost blank subframe proportioning comprises calculating a first sum of the load metrics pertaining to the first subset of network nodes, calculating a second sum of the load metrics of nodes in the second subset relating to almost blank subframes, and determining an updated almost blank subframe proportion as a function of the first sum and the second sum.

12. The method of claim 10, wherein load metric information of a node in the second subset relating to almost blank subframes is based on a number of users eligible for service by the node within almost blank subframes.

13. The apparatus of claim 1, wherein load metric information is communicated by network nodes to the apparatus, and the apparatus comprises at least one of a node of the network and a centralized controller.

14. The apparatus of claim 1, wherein the first subset of nodes comprises macro cells and the second subset of nodes comprises pico cells.

15. The method of claim 12, wherein load metric information of a node in the first subset is based on a number of users served by the node.

16. The method of claim 10, wherein load metric information of a node in the first subset is based on a proportionally fair metric of the node, and load metric information of a node in the second subset relating to almost blank sub frames is based on a proportionally fair metric of the node averaged within almost blank subframes.

17. The method of claim 10, wherein updating almost blank subframe proportioning to create an updated proportioning based on the load metric information comprises determining a target almost blank subframe proportioning based on the load metric information, determining a step size based on a difference between a current almost blank subframe proportioning and the target almost blank subframe proportioning, and creating an updated almost blank subframe proportioning based on the current almost blank subframe proportioning and the step size.

18. The apparatus of claim 1, wherein the program of instructions is further configured to, with the memory and the at least one processor, configure the apparatus to perform actions comprising at least:
   constructing a list of almost blank subframe patterns comprising at least a first almost blank subframe pattern and a second almost blank subframe pattern;
   identifying a third set of almost blank subframes which is a subset of the sets of almost blank subframes of the first almost blank subframe pattern and the second almost blank subframe pattern;
   providing the third set of almost blank subframes to at least one user device for use as a measurement restriction subset when making measurements to represent channel quality;
   selecting an updated almost blank subframe pattern from the list of almost blank subframe patterns; and
   wherein providing the user device an updated measurement restriction subset is not performed when the updated almost blank subframe pattern is selected.

19. A non-transitory computer readable medium storing a program of instructions, execution of which by a processor configures an apparatus to at least:
   monitor load metric information relating to loads affecting one or more nodes of a network comprising at least a first subset of nodes that employ almost blank subframes and a second subset of nodes; and
   update almost blank subframe proportioning to create an updated proportioning based on the load metric information, wherein load metric information of at least one node in the second subset comprises load metric information relating to almost blank subframes;
   wherein updating almost blank subframe proportioning comprises:
      calculating a first sum of the load metrics pertaining to the first subset of network nodes;
      calculating a second sum of the load metrics of nodes in the second subset relating to almost blank subframes; and
      determining an updated almost blank subframe proportion as a function of the first sum, and the second sum.

* * * * *

UNITED STATES PATENT AND TRADEMARK OFFICE
CERTIFICATE OF CORRECTION

| | | |
|---|---|---|
| PATENT NO. | : 8,594,672 B2 | Page 1 of 1 |
| APPLICATION NO. | : 13/332538 | |
| DATED | : November 26, 2013 | |
| INVENTOR(S) | : Rajeev Agrawal et al. | |

It is certified that error appears in the above-identified patent and that said Letters Patent is hereby corrected as shown below:

In the Claims

In Claim 6:
Column 13, line 67, "UEs" should be delete and --User Equipments-- should be inserted.

Signed and Sealed this
Eleventh Day of February, 2014

Michelle K. Lee
*Deputy Director of the United States Patent and Trademark Office*